(12) United States Patent
Tait et al.

(10) Patent No.: US 7,396,493 B2
(45) Date of Patent: *Jul. 8, 2008

(54) MULTILAYER OPTICAL FILM WITH MELT ZONE TO CONTROL DELAMINATION

(75) Inventors: Bruce E. Tait, Woodbury, MN (US); Steven J. Dobrzynski, Osceola, WI (US); David K. Mortenson, White Bear Lake, MN (US); John A. Wheatley, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 397 days.

This patent is subject to a terminal disclaimer.

(21) Appl. No.: 10/268,354

(22) Filed: Oct. 10, 2002

(65) Prior Publication Data

US 2003/0219577 A1 Nov. 27, 2003

Related U.S. Application Data

(63) Continuation-in-part of application No. 10/152,411, filed on May 21, 2002, now abandoned.

(51) Int. Cl.
*B29D 11/00* (2006.01)
*D01D 5/16* (2006.01)

(52) U.S. Cl. .............. 264/1.7; 264/210.2; 219/121.66; 219/121.72; 225/2; 428/57; 428/101

(58) Field of Classification Search ............ 264/1.6, 264/1.7, 2.7, 210.2; 428/43, 57, 101, 202; 219/121.66, 121.72; 225/2

See application file for complete search history.

(56) References Cited

U.S. PATENT DOCUMENTS

| | | | |
|---|---|---|---|
| 3,560,291 A | 2/1971 | Foglia et al. | |
| 3,610,724 A | 10/1971 | Frizzell | |
| 3,610,729 A | 10/1971 | Rogers | |
| 3,626,143 A | 12/1971 | Fry | |
| 3,633,333 A * | 1/1972 | Schlemmer et al. | 53/553 |
| 3,711,176 A | 1/1973 | Alfrey et al. | |
| 3,790,744 A | 2/1974 | Bowen | |
| 3,792,519 A | 2/1974 | Haver | |
| 3,996,461 A | 12/1976 | Sulzbach et al. | |
| 4,158,133 A | 6/1979 | Spaeth et al. | |
| 4,323,757 A | 4/1982 | Oka et al. | |
| 4,370,025 A | 1/1983 | Sato et al. | |
| 4,414,051 A | 11/1983 | Bose | |
| 4,446,305 A | 5/1984 | Rogers et al. | |
| 4,466,305 A | 8/1984 | Hiraiwa et al. | |
| 4,490,203 A | 12/1984 | Bose | |
| 4,498,923 A * | 2/1985 | Cline | 75/10.11 |
| 4,498,925 A * | 2/1985 | Cline | 75/10.11 |
| 4,520,189 A | 5/1985 | Rogers et al. | |
| 4,521,588 A | 6/1985 | Rogers et al. | |
| 4,540,623 A | 9/1985 | Im et al. | |
| 4,547,432 A | 10/1985 | Pitts et al. | |
| 4,549,063 A | 10/1985 | Ang et al. | |
| 4,705,356 A | 11/1987 | Berning et al. | |
| 4,832,453 A * | 5/1989 | Saad-Cook | 359/896 |
| 4,945,203 A * | 7/1990 | Soodak et al. | 219/121.64 |
| 4,987,287 A | 1/1991 | Jack | |
| 5,103,337 A | 4/1992 | Schrenk et al. | |
| 5,241,471 A | 8/1993 | Trousset et al. | |
| 5,269,995 A | 12/1993 | Ramanathan et al. | |
| 5,316,703 A | 5/1994 | Schrenk | |
| 5,360,659 A | 11/1994 | Arends et al. | |
| 5,437,960 A | 8/1995 | Nagate et al. | |
| 5,448,404 A | 9/1995 | Schrenk et al. | |
| 5,486,949 A | 1/1996 | Schrenk et al. | |
| 5,686,979 A | 11/1997 | Weber et al. | |
| 5,699,188 A | 12/1997 | Gilbert et al. | |
| 5,711,838 A | 1/1998 | Pankoke | |
| 5,783,120 A | 7/1998 | Ouderkirk et al. | |
| 5,808,794 A | 9/1998 | Weber et al. | |
| 5,825,542 A | 10/1998 | Cobb, Jr. et al. | |
| 5,882,774 A | 3/1999 | Jonza et al. | |

(Continued)

FOREIGN PATENT DOCUMENTS

EP 0 472 244 2/1992

(Continued)

OTHER PUBLICATIONS

Patent Abstracts of Japan, vol. 017, No. 694 (M-1531) Dec. 17, 1993 & JP 05 237964 A, Sep. 17, 1993.

(Continued)

*Primary Examiner*—Keith D. Hendricks
*Assistant Examiner*—Lawrence Ferguson

(57) ABSTRACT

Polymeric multilayer optical films, and laminate bodies that include such films, are provided with a melt zone that extends between a first and second portion of the multilayer optical film. If a shearing operation or other external influence acts on the film in the first portion that causes delamination of individual layers of the multilayer optical film, the melt zone is effective to prevent the delamination from propagating from the first portion to the second portion. The melt zone is characterized at least in part by a deformation of individual layers of the multilayer optical film. The melt zone can be positioned to extend along and proximate to some or all of a periphery of the multilayer optical film.

7 Claims, 5 Drawing Sheets

U.S. PATENT DOCUMENTS

| | | | |
|---|---|---|---|
| 5,962,114 A | 10/1999 | Jonza et al. | |
| 5,965,247 A | 10/1999 | Jonza et al. | |
| 5,980,666 A | 11/1999 | Roth et al. | |
| 6,045,894 A | 4/2000 | Jonza et al. | |
| 6,049,419 A | 4/2000 | Wheatley et al. | |
| 6,059,913 A | 5/2000 | Asmussen et al. | |
| 6,096,247 A | 8/2000 | Ulsh et al. | |
| 6,103,050 A | 8/2000 | Krueger | |
| 6,157,490 A | 12/2000 | Wheatley et al. | |
| 6,185,039 B1 | 2/2001 | Allen et al. | |
| 6,191,382 B1 | 2/2001 | Damikolas | |
| 6,207,925 B1 | 3/2001 | Kendall | |
| 6,287,184 B1 | 9/2001 | Carpentier et al. | |
| 6,303,901 B1 | 10/2001 | Perry et al. | |
| 6,368,699 B1 | 4/2002 | Gilbert et al. | |
| 6,551,436 B1 | 4/2003 | Flohr et al. | |
| 6,689,245 B2 | 2/2004 | Tsujimoto | |
| 6,808,658 B2 * | 10/2004 | Stover | 264/1.6 |
| 6,972,065 B1 | 12/2005 | Arnold | |
| 6,991,695 B2 * | 1/2006 | Tait et al. | 156/248 |
| 2001/0052659 A1 | 12/2001 | Nakai et al. | |
| 2002/0015836 A1 | 2/2002 | Jonza et al. | |
| 2002/0025444 A1 | 2/2002 | Hebrink et al. | |
| 2004/0031362 A1 | 2/2004 | Mizuta | |

FOREIGN PATENT DOCUMENTS

| | | |
|---|---|---|
| EP | 0 540 215 | 5/1993 |
| GB | 1369332 | 10/1974 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 97/01440 | 1/1997 |
| WO | WO 99/36248 | 7/1999 |
| WO | WO 99/36257 | 7/1999 |
| WO | WO 99/36258 | 7/1999 |
| WO | WO 99/36262 | 7/1999 |
| WO | WO 99/39224 | 8/1999 |
| WO | WO 01/23915 | 4/2001 |
| WO | WO 02/34514 | 5/2002 |

OTHER PUBLICATIONS

Patent Abstracts of Japan, vol. 2000, No. 23, Feb. 10, 2001 & JP 2001 166141A, Jun. 22, 2001.

Patent Abstracts of Japan, vol. 1999, No. 13, Nov. 30, 1999 & JP 11 231129, Aug. 27, 1999.

Dillon, John A., "Processing 2D Shapes", Reprinted with revisions, *Industrial Laser Solutions*, May 2001.

Schrenk et al., Nanolayer polymeric optical films, Tappi Journal, pp. 169-174, Jun. 1992.

Process 1 (admitted prior art) (see attachment) and Process 2 (admitted prior art) (see attachment).

Weber et al., "Giant Birefringent Optics in Multilayer Polymer Mirrors", Science, vol. 287, Mar. 31, 2000, pp. 2451-2456.

Harada et al., Phototopic Detector Systems, U.S. Appl. No. 10/152,546, filed May 21, 2002.

Tait et al., Method for Subdividing Multilayer Optical Film Cleanly and Rapidly, U.S. Appl. No. 10/152,412, filed May 21, 2002.

Weber et al., Color Shifting Film, U.S. Appl. No. 09/006,591, filed Jan. 13, 1998.

Lin et al., Wrinkle Resistant Infrared Reflecting Film and Non-Planar Laminate Articles Made Therefrom, U.S. Appl. No. 09/590,924, filed Jun. 9, 2000.

Tait, Multilayer Optical Film With Melt Zone to Control Delamination, U.S. Appl. No. 10/152,411, filed May 21, 2002.

Tait et al., Method for Subdividing Multilayer Optical Film Cleanly and Rapidly, U.S. Appl. No. 10/268,118, filed Oct. 10, 2002.

* cited by examiner

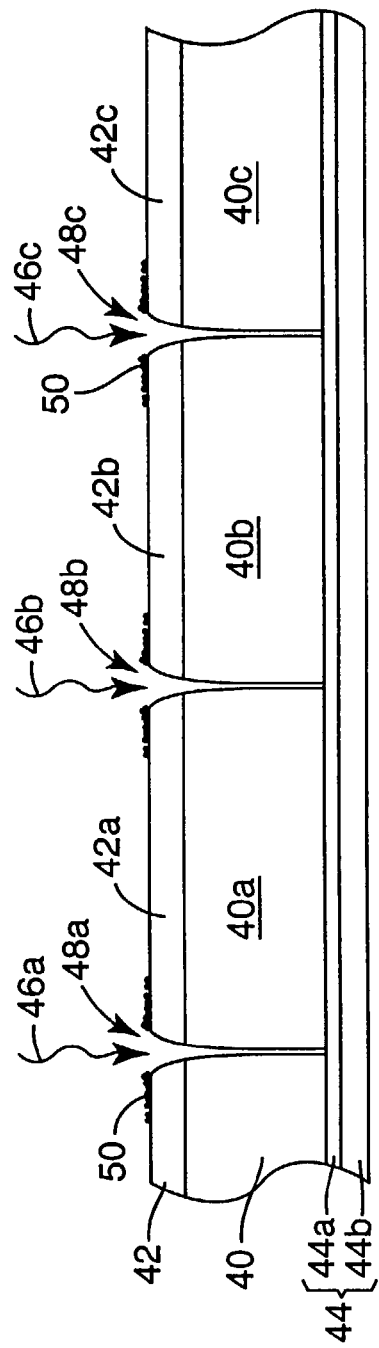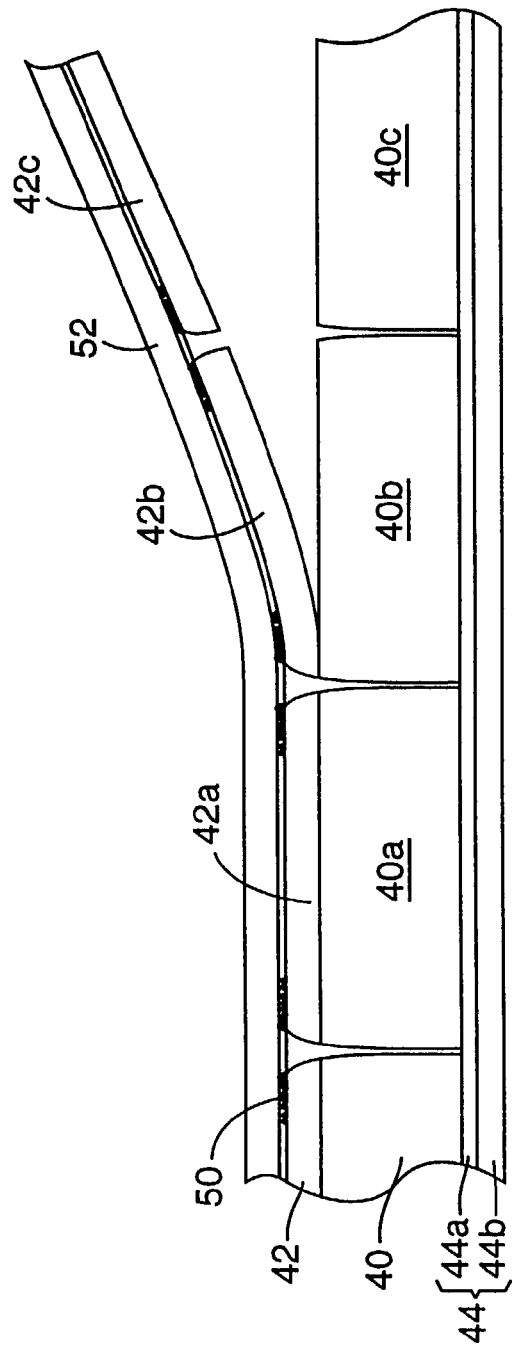

US 7,396,493 B2

1

MULTILAYER OPTICAL FILM WITH MELT ZONE TO CONTROL DELAMINATION

CROSS REFERENCE TO RELATED APPLICATIONS

This application is a continuation-in-part of pending U.S. application Ser. No. 10/152,411, filed May 21, 2002, now abandoned, and claims priority thereto.

FIELD OF THE INVENTION

The present invention relates to optical bodies comprising multilayer optical films having desirable transmission and/or reflection properties for light of given wavelengths, polarizations, and/or directions. In particular, the invention relates to techniques and constructions that control delamination of such films.

BACKGROUND

Multilayer optical films, i.e., films that provide desirable transmission and/or reflection properties at least partially by an arrangement of microlayers of differing refractive index, are known. It has long been known to make such multilayer optical films by depositing a sequence of inorganic materials in optically thin layers ("microlayers") on a substrate in a vacuum chamber. Typically, the substrate is a relatively thick piece of glass, limited in size due to constraints on the vacuum chamber volume and/or the degree of uniformity possible by the deposition process.

More recently, multilayer optical films have been demonstrated by coextrusion of alternating polymer layers. See, e.g., U.S. Pat. Nos. 3,610,724 (Rogers), 4,446,305 (Rogers et al.), 4,540,623 (Im et al.), 5,448,404 (Schrenk et al.), and 5,882,774 (Jonza et al.), the disclosures of which are incorporated herein by reference in their entireties. In these polymeric multilayer optical films, polymer materials are used predominantly or exclusively in the makeup of the individual layers. Such films are compatible with high volume manufacturing processes, and can be made in large sheets and roll goods.

Many product applications, however, require relatively small and numerous pieces of film. Filters for individual photodiode detectors is one such application. Windows, reflectors, and/or filters for fiber optic devices and other small-scale photonics devices are additional applications. For these applications, small pieces of multilayer optical film can be obtained from a larger sheet of such film by subdividing the sheet by mechanical means, such as by cutting the sheet with a shearing device (e.g., a scissors), or slitting the sheet with a blade. However, the forces exerted on the film by the cutting mechanism can produce layer delamination in a region along the cut line or edge of the film. This is particularly true for many polymeric multilayer optical films. The delamination region is often discernable by a discoloration relative to intact areas of the film. Because the multilayer optical film relies on intimate contact of the individual layers to produce the desired reflection/transmission characteristics, the delamination region fails to provide those desired characteristics.

In some product applications, the delamination may not be problematic or even noticeable. In others—particularly where it is important for substantially the entire piece of film from edge to edge to exhibit the desired reflection or transmission characteristics, or where the film can be subjected to mechanical stresses and/or wide temperature variations that could cause the delamination to propagate in the film over time—the delamination can be highly detrimental. Also in some cases some amount of delamination may be difficult to avoid due to a need to mechanically cut or sever at least a portion of a periphery of a piece of multilayer optical film.

There exists, therefore, a need for controlling delamination in multilayer optical films. Preferably, the approach would be compatible with automated and/or continuous manufacturing processes.

BRIEF SUMMARY

The present application discloses polymeric multilayer optical film bodies provided with a melt zone that extends between a first and second portion of the multilayer optical film. If a shearing operation or other external influence acts on the film in the first portion that causes delamination of individual layers of the multilayer optical film, the melt zone is effective to prevent the delamination from propagating from the first portion to the second portion. The melt zone is characterized at least in part by a deformation of individual layers of the multilayer optical film. The melt zone can be positioned to extend along and proximate to some or all of a periphery of the multilayer optical film body.

The melt zones can be formed in a process wherein a first and second liner are removably applied to opposed major surfaces of the multilayer optical film body. Laser radiation is then directed at the film body through one of the liners (arbitrarily designated the first liner), the laser radiation being adapted to produce one or more melt zones that separate different portions of the film body. The laser radiation can also produce cut lines that define a plurality of pieces of the first liner and of the film body. Typically, the laser radiation produces a plume of smoke and debris that deposits on the workpiece—in this case, on the first liner. Thereafter, the first liner (with accompanying debris), or pieces thereof, is removed from the multilayer optical film body (or pieces thereof) while the multilayer optical film body is supported by the second liner. The removal can be accomplished by contacting the first liner with an adhesive tape and pulling the tape away from the multilayer optical film body. If debris caused by the laser radiation is not considered detrimental in a particular application, the liners can be dispensed with.

BRIEF DESCRIPTION OF THE DRAWINGS

Throughout the specification reference is made to the appended drawings, where like reference numerals designate like elements, and wherein:

FIG. 3 is a sectional view of a multilayer optical film body disposed between an upper and lower liner, the figure further depicting electromagnetic radiation forming gaps at cut lines that define discrete pieces of the multilayer optical film body and of the upper liner;

FIG. 4 is a sectional view similar to FIG. 3, but where an adhesive film has been applied to the upper liner so that it can remove the pieces of upper liner from the pieces of multilayer optical film body;

DETAILED DESCRIPTION OF THE
ILLUSTRATIVE EMBODIMENTS

As used herein, "film" refers to an extended optical body whose thickness is generally no more than about 0.25 mm (10 thousandths of an inch, or "mils"). In some instances a film can be attached or applied to another optical body such as a rigid substrate or another film having suitable reflection or transmission properties. The film can also be in a physically flexible form, whether it is free-standing or attached to other flexible layer(s). The term "film body" as used herein shall mean a film whether by itself or in combination with other components, such as in a laminate construction.

Figure 1:
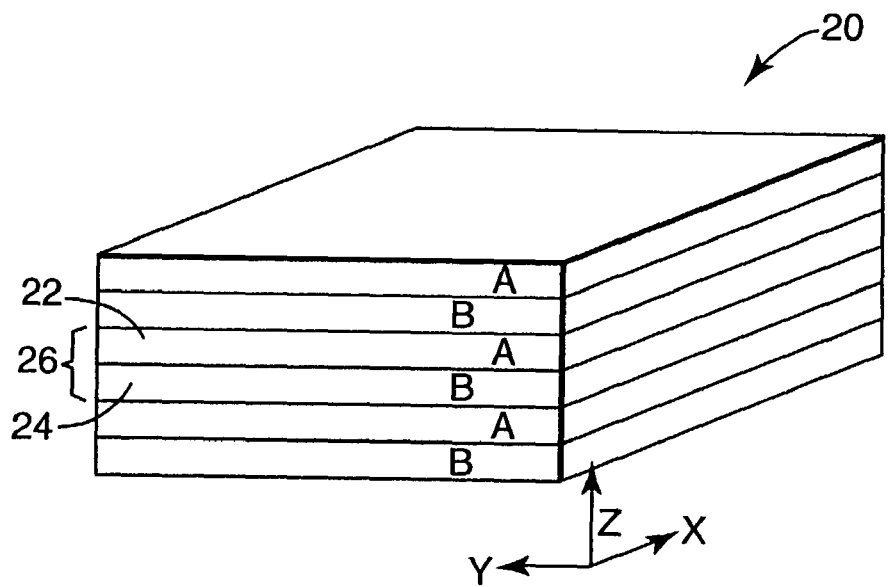
FIG. 1 is a greatly magnified perspective view of a multilayer optical film body.

FIG. 1 depicts a multilayer optical film body 20. The film body comprises individual microlayers 22, 24. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. However, thicker layers can also be included, such as skin layers at the outer surfaces of the film, or protective boundary layers disposed within the film that separate packets of microlayers. Multilayer optical film body 20 can also comprise one or more thick adhesive layers to bond two or more sheets of multilayer optical film in a laminate.

The reflective and transmissive properties of multilayer optical film body 20 are a function of the refractive indices of the respective microlayers. Each microlayer can be characterized at least at localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively (see FIG. 1). In practice, the refractive indices are controlled by judicious materials selection and processing conditions. Film body 20 can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. In order to achieve high reflectivities with a reasonable number of layers, adjacent microlayers preferably exhibit a difference in refractive index ($\Delta n_x$) for light polarized along the x-axis of at least 0.05. If the high reflectivity is desired for two orthogonal polarizations, then the adjacent microlayers also preferably exhibit a difference in refractive index ($\Delta n_y$) for light polarized along the y-axis of at least 0.05. Otherwise, the refractive index difference $\Delta_y$ can be less than 0.05 and preferably about 0 to produce a multilayer stack that reflects normally incident light of one polarization state and transmits normally incident light of an orthogonal polarization state.

If desired, the refractive index difference ($\Delta n_z$) between adjacent microlayers for light polarized along the z-axis can also be tailored to achieve desirable reflectivity properties for the p-polarization component of obliquely incident light. For ease of explanation in what follows, at any point of interest on an interference film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \leq n_{2x}$, i.e., $\Delta n \leq 0$.

To maintain high reflectivity of p-polarized light at oblique angles, the z-index mismatch $\Delta n_z$ between microlayers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Exemplary materials that can be used in the fabrication of polymeric multilayer optical film can be found in PCT Publication WO 99/36248 (Neavin et al.), incorporated herein by reference. Desirably, at least one of the materials is a polymer with a stress optical coefficient having a large absolute value. In other words, the polymer preferably develops a large birefringence (at least about 0.05, more preferably at least about 0.1 or even 0.2) when stretched. Depending on the application of the multilayer film, the birefringence can be developed between two orthogonal directions in the plane of the film, between one or more in-plane directions and the direction perpendicular to the film plane, or a combination of these. In special cases where isotropic refractive indices between unstretched polymer layers are widely separated, the preference for large birefringence in at least one of the polymers can be relaxed, although birefringence is still often desirable. Such special cases may arise in the selection of polymers for mirror films and for polarizer films formed using a biaxial process, which draws the film in two orthogonal in-plane directions. Further, the polymer desirably is capable of maintaining birefringence after stretching, so that the desired optical properties are imparted to the finished film. A second polymer can be chosen for other layers of the multilayer film so that in the finished film the refractive index of the second polymer, in at least one direction, differs significantly from the index of refraction of the first polymer in the same direction. For convenience, the films can be fabricated using only two distinct polymer materials, and interleaving those materials during the extrusion process to produce alternating layers A, B, A, B, . . . as shown in FIG. 1. Interleaving only two distinct polymer materials is not required, however. Instead, each layer of a multilayer optical film can be composed of a unique material or blend not found elsewhere in the film. Preferably, polymers being coextruded have the same or similar melt temperatures.

Exemplary two-polymer combinations that provide both adequate refractive index differences and adequate interlayer adhesion include: (1) for polarizing multilayer optical film made using a process with predominantly uniaxial stretching, PEN/coPEN, PET/coPET, PEN/sPS, PET/sPS, PEN/Eastar,™ and PET/Eastar,™ where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, "sPS" refers to syndiotactic polystyrene and its derivatives, and Eastar™ is a polyester or copolyester (believed to comprise cyclohexanedimethylene diol units and terephthalate units) commercially available from Eastman Chemical Co.; (2) for any polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/Ecdel,™ PET/Ecdel,™ PEN/sPS, PET/sPS, PEN/coPET, PEN/PETG, and PEN/THV,™ where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., and THV™ is a fluoropolymer commercially available from 3M Company.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.), all of which are incorporated herein by reference. Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

In a simple embodiment, the microlayers can have thicknesses corresponding to a ¼-wave stack, i.e., arranged in optical repeat units or unit cells each consisting essentially of two adjacent microlayers of equal optical thickness (f-ratio=50%), such optical repeat unit being effective to reflect by constructive interference light whose wavelength λ is twice the overall optical thickness of the optical repeat unit. Such an arrangement is shown in FIG. 1, where microlayer 22 of polymer A adjacent to microlayer 24 of polymer B forms a unit cell or optical repeat unit 26 that repeats throughout the stack. Thickness gradients along a thickness axis of the film (e.g., the z-axis) can be used to provide a widened reflection band. Thickness gradients tailored to sharpen such band edges can also be used, as discussed in U.S. Pat. No. 6,157,490 (Wheatley et al.), also incorporated herein by reference.

Other layer arrangements, such as multilayer optical films having 2-microlayer optical repeat units whose f-ratio is different from 50%, or films whose optical repeat units consist essentially of more than two microlayers, are also contemplated. These alternative optical repeat unit designs can reduce or eliminate certain higher-order reflections. See, e.g., U.S. Pat. Nos. 5,360,659 (Arends et al.) and 5,103,337 (Schrenk et al.).

Figure 2:
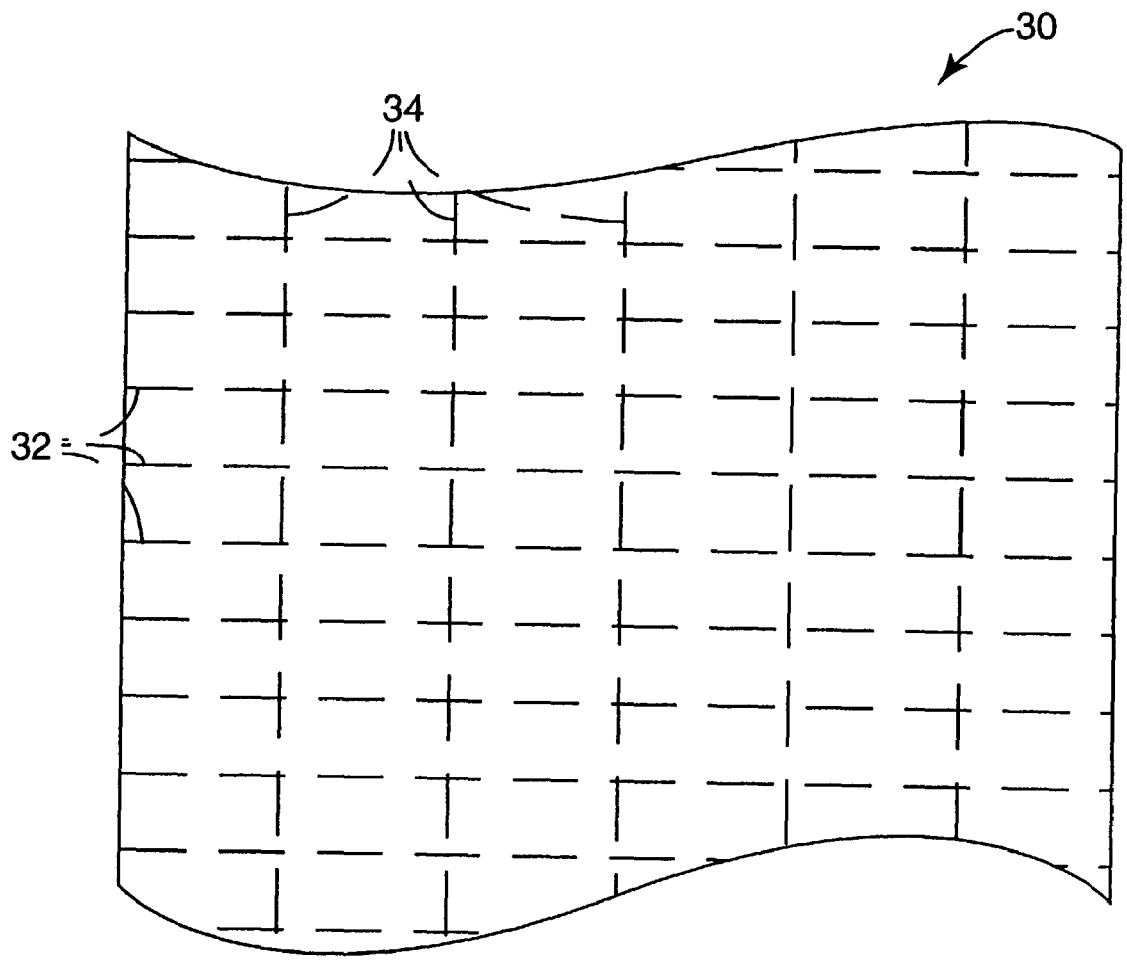
FIG. 2 is a plan view of a sheet of multilayer optical film body, with broken cut lines indicating how it is to be subdivided.

FIG. 2 shows a portion of a sheet of a multilayer optical film body 30 in plan view. Film body 30 is manufactured and sold or supplied in transverse dimensions that are larger than desired for a particular end-use application. Subdividing the film body 30 into a smaller piece or pieces is therefore required to adapt the film to the application. The desired size and shape of the pieces can vary widely. For simplicity, FIG. 2 shows pieces defined by two intersecting sets of parallel cut lines, labeled 32 and 34. If both sets of cut lines are used, film body 30 is converted into discrete rectangular (including square) or parallelogram-shaped pieces that extend in two directions, i.e., the length and width of film 30. If only one of the sets is used, the pieces become elongated rectangular strips. Of course, the cut lines need not be straight, and can include curves, bends, angles, and straight sections in any combination. Often, however, simple shapes such as circles, rectangles, parallelograms, or other polygons are all that is required.

Applicants have found laser radiation to be useful in cutting and subdividing polymeric multilayer optical film bodies without any substantial delamination at the cut lines. The laser radiation is selected to have a wavelength at which at least some of the materials of the optical film have substantial absorption so that the absorbed electromagnetic radiation can vaporize the film body along the cut line. Otherwise, the laser radiation would be transmitted or reflected by the film just as other incident light, whose wavelength is within an intended operating range of the film. The laser radiation is also shaped with suitable focusing optics and controlled to suitable power levels to accomplish the vaporization along a narrow cut line. Preferably, the laser radiation can also be rapidly scanned across the workpiece according to pre-programmed instructions, and switched on and off rapidly so that cut lines of arbitrary shape can be followed. Commercially available systems found to be useful in this regard are being marketed as the LaserSharp brand of laser processing modules, sold by LasX Industries Inc., St. Paul, Minn. These modules use a $CO_2$ laser source operating at a wavelength of about 10.6 µm (from about 9.2-11.2 µm) to cut the workpiece.

Applicants have also found that vaporized material created during the laser radiation cutting process can accumulate as debris on the workpiece. Such debris can accumulate to an extent that makes the piece of film unacceptable for the intended application. To avoid this problem, a first liner can be applied to the multilayer optical film body before the laser cutting operation. If intimate contact is maintained between the first liner and the multilayer optical film body, any debris created during the cutting step accumulates on the first liner rather than on the multilayer optical film body. The first liner, however, is also preferably applied in a way that permits it to be readily removed so that a clean piece of multilayer optical film body can be obtained. In one approach, the first liner can be applied to the multilayer optical film body electrostatically prior to laser cutting. The electrostatic charge can later be at least partially neutralized to reduce the attraction of the liner to the film body and thus permit the separation thereof. Alternatively, a thin layer of low tack adhesive can be used, such as the type used for repositionable office notes.

During cutting, the laser radiation is preferably directed at the multilayer optical film body through the first liner. Therefore, unless the first liner is non-absorbing at the laser wavelength, the first liner will be cut into pieces substantially identical to the pieces of the multilayer optical film body since the two layers are in intimate contact. That is, as the laser radiation is controlled to cut distinct pieces of the multilayer optical film body, it simultaneously cuts substantially identical pieces of the first liner. A preferred first liner is paper. Paper vaporizes but does not melt upon exposure to the laser radiation, and thus the pieces of paper do not become bonded to the adjacent pieces of multilayer optical film body. The paper can be treated with a very thin (well under 1 mil) layer of silicone and still retain these desirable properties. In such case the silicone-treated side of the paper preferably contacts the multilayer optical film body. Other materials that exhibit minimal or no melting upon exposure to the laser radiation can also be used.

For convenience in handling, a second liner can be applied to the multilayer optical film body on a side thereof opposed to the first liner. Moreover, by appropriate selection of liners and appropriate control of laser radiation, a so-called "kiss-cut" can be achieved along at least some of the cut lines, whereby the first liner and the multilayer optical film body are completely vaporized at the cut line, but the second liner is not completely vaporized but instead is at least partially intact, and preferably substantially fully intact. In this way, the distinct pieces of the multilayer optical film body can be formed but can still be carried in an ordered arrangement and handled as a web or sheet for rapid processing. The second liner serves as a substrate for supporting and carrying the individual pieces after they have been cut. Note that the second liner can support and carry the individual pieces whether it is oriented above or below such pieces.

FIG. 3 is illustrative in this regard. In the sectional view of that figure, a polymeric multilayer optical film body 40 is depicted as a single layer for simplicity. A first liner 42 and a second liner 44 have been applied to be in intimate contact with opposed major surfaces of the film body 40. Liner 44 is shown as comprising two layers 44a, 44b, for reasons discussed below. Laser radiation 46a, 46b, 46c is directed at film body 40 through liner 42 at cut lines 48a, 48b, 48c respectively. Suitable beam shaping optics and power control (not shown) are provided so that narrow gaps are formed as shown by vaporization of liner 42 and film body 40, while liner 44 remains substantially intact. Some of the vaporized material accumulates as debris 50 on first liner 42. The cut lines and gaps define distinct pieces 40a, 40b, 40c of multilayer film body 40 and corresponding pieces 42a, 42b, 42c of liner 42. In FIG. 3 the pieces of liner 42 remain in intimate contact with the pieces of multilayer film body 40 such as by electrostatic attraction or other reversible attachment mechanism.

Cut lines 48a-c can be formed simultaneously or sequentially. The LaserSharp laser processing modules mentioned above scan a single beam of laser radiation, whereby radiation 46a-c represent sequential scans of the beam.

FIG. 4 depicts a technique for conveniently removing the debris-coated liner pieces 42a-c from the multilayer optical film body pieces 40a-c. A pressure sensitive adhesive tape 52 is placed in contact with the construction of FIG. 3 such that the pressure sensitive adhesive contacts the first liner 42. If film 42 is held to film body 40 electrostatically during laser cutting, the electrostatic forces are preferably substantially neutralized or at least reduced such that the attractive force between liner 42 and film body 40 is substantially less than the attractive force between liner 42 and tape 52. Then, liner pieces 42a-c can be rapidly separated from film body pieces 40a-c by simply pulling tape 52 away from film body 40, or vice versa. Tens, hundreds, or thousands of discrete liner pieces can be readily and rapidly removed in this way. Tape 52 preferably extends the width of the multilayer optical film body 40 so as to simultaneously contact a row of the plurality of pieces to be cut. After removal of liner pieces 42a-c, the multilayer optical film body pieces 40a-c are also desirably separated from second liner 44. Preferably, this is done by providing a relatively weak bond between film body 40 and second liner 44. Such bond can be achieved electrostatically or by use of a small amount of low-tack pressure sensitive adhesive. The bond is weak enough to permit easy separation of pieces 40a-c by passing the liner 44 around a sharp corner or bend and gently removing pieces 40a-c therefrom.

Liner 44 preferably comprises at least two layers 44a, 44b selected to facilitate kiss-cutting. Layer 44a, disposed adjacent the multilayer optical film body 40, is preferably composed of a material having a substantially lower absorption of the laser radiation than that of film body 40. Having lower absorption, layer 44a can experience little or no vaporization during the laser cutting procedure with appropriate control of the laser. A polyethylene material with a thickness of about 0.001 inch (25 µm) or more has been found to be adequate for a $CO_2$ laser cutting system operating at about 10.6 µm. Such material however can stretch or deform from the heat generated by the laser at the cut lines. If the liner 44 is held in tension and used to move the multilayer optical film body 40 through the laser cutting area, stretching or deformation of liner layer 44a can cause pieces 40a-c to move out of alignment with each other and thus cause mispositioned laser cuts. For this reason layer 44b is preferably composed of a relatively high modulus material such as a high modulus adhesive-coated paper to keep the film body 40 and film pieces 40a-c dimensionally stable.

Multilayer optical film body pieces 40a-c have edges substantially devoid of delamination by use of the laser cutting procedure, and also have clean major surfaces free of debris by use of first and second liners 42, 44. The heat generated by the laser radiation deforms the microlayers at the edges to produce a kind of seal of the multilayer optical film.

Figure 5:
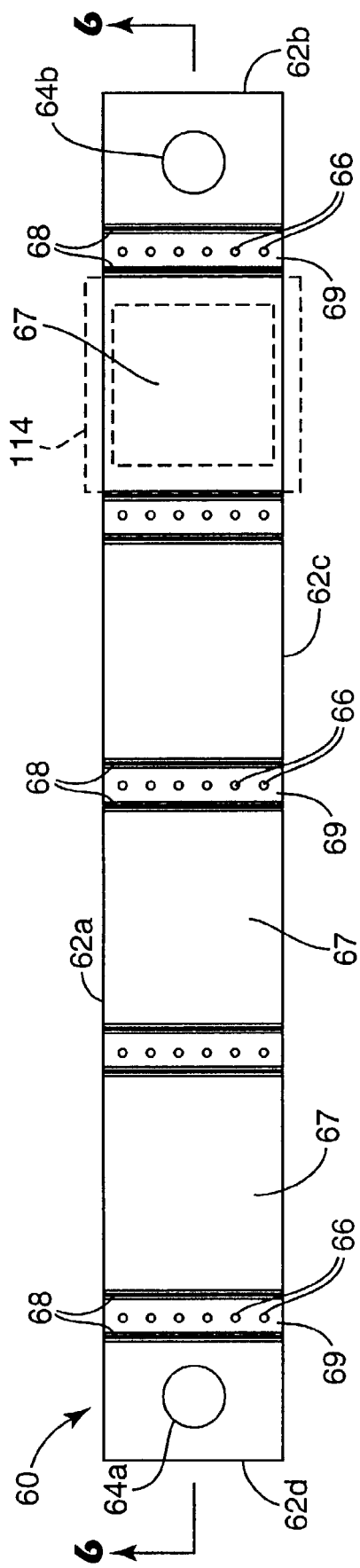
FIG. 5 is a plan view of a piece of multilayer optical film body cut from a larger sheet.

FIG. 5 shows a plan view of a piece of polymeric multilayer optical film body 60 that has been subdivided from a larger sheet of a polymeric multilayer optical film body. Piece 60 has laser-cut peripheral edges 62a-d defining an elongated strip, preferably by kiss-cutting as depicted in FIG. 3. Additional laser cuts are provided to enable further subdivision of the multilayer optical film body into individual filter packages. Edges 64a, 64b define alignment holes for mounting the strip in an injection molding apparatus. These edges are also preferably kiss-cut. Points 66 define linear arrays of holes serving the function of perforation lines to permit tearing or shearing along such lines. During laser cutting, the laser radiation is preferably controlled to make a complete through-cut (not simply a kiss cut) through the multilayer optical film body and through both first and second liners at points 66. Preferably, one hole intersects peripheral edge 62a and another hole intersects peripheral edge 62c so that a fractional hole or notch is provided along each edge for ease of tearing.

Melt zones 68 are formed by reducing the laser radiation to levels that do not vaporize completely through multilayer film body 60. This can be accomplished by defocusing the laser beam, reducing the laser power, and/or scanning the laser more rapidly across the workpiece. Although some of the multilayer optical film body can be vaporized at melt zones 68, at least a portion of the multilayer optical film body thickness remains intact at melt zones 68, though distorted by the localized heating. This distortion can be exemplified by localized rippling or undulation of the microlayers as well as co-mixing and a resulting loss of distinct individual microlayers. The melt zones 68 are provided to prevent the spread of delamination that can occur when the piece 60 is later cut into even smaller pieces by shear or tensile mechanical means along the perforation lines.

As shown in FIG. 5, melt zones 68 extend across the width of the strip and are arranged in pairs that alternately define active window areas 67 and mechanical separation areas 69. Perforation holes such as those defined at points 66 can be provided in the mechanical separation areas 69, or they can be omitted. Whether perforation holes are provided or not, melt zones 68 that border the separation area 69 are preferably spaced far enough apart so that a continuous band of multilayer optical film, undistorted by the laser cutting process and extending across the width of the strip, borders each melt zone. These bands of undistorted multilayer optical film act as buffer zones that help prevent the spread of delamination when window areas 67 are separated from each other by mechanical action (such as application of tensile force if perforation holes are present, or by shearing means) across separation areas 69.

Melt zones are preferably spaced apart a small distance, usually about 1 mm or less, from the edges that form the periphery of the final optical part. Such a part can have an arbitrary shape but is often a polygon such as a rectangle. The melt zones can be provided in a multilayer optical film article that is later mechanically cut or severed along one or more edges proximate to the melt zone(s), or the melt zones can be provided in the article after mechanical cutting has occurred. The melt zones can be provided in one or more closely spaced pairs, and mechanical cutting or severing can be performed in the portion between the pairs. In sum, a melt zone is preferably an extended feature that separates a first and second portion of a multilayer optical film body, where delamination of the multilayer optical film can occur on one side of the melt zone and the melt zone is effective to inhibit such delamination from crossing over to the other side.

Figure 6:
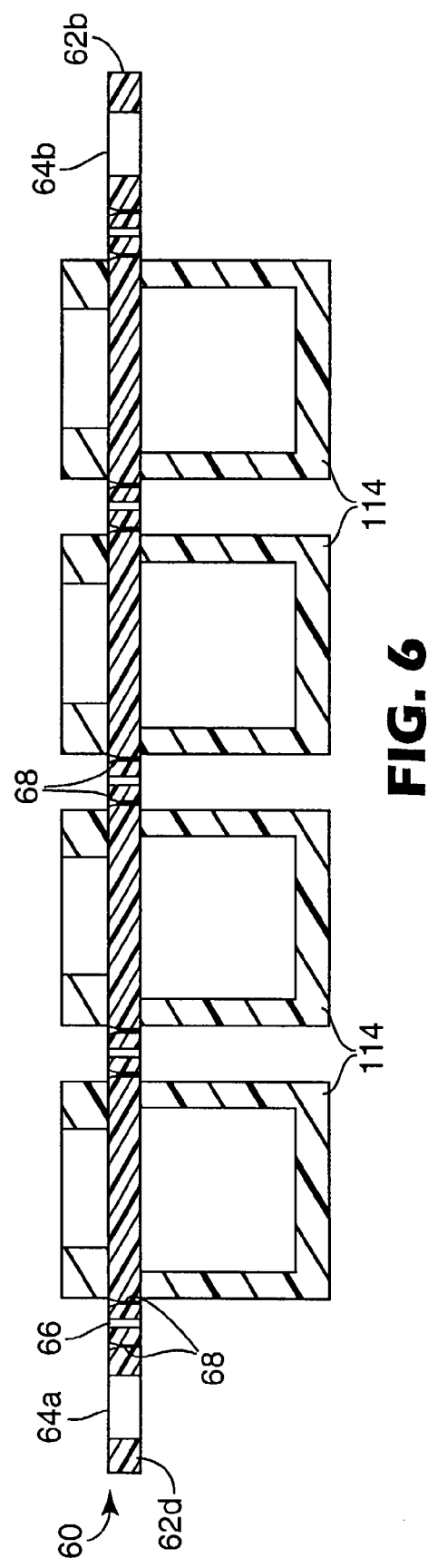
FIG. 6 is a sectional view through the piece of multilayer optical film body of FIG. 5 with a plurality of filter frames attached thereto.

One or more multilayer optical film body pieces 60 can be placed in an injection molding machine using alignment holes defined by edges 64a, 64b. Molten polymer material can then be formed in a series of boxes or frames 114 around the piece 60 as shown best in the sectional view of FIG. 6. After cooling, individual filter assemblies can be made by mechanically cutting the multilayer film body 60 along the perforation lines defined by points 66. Such individual filter assemblies and applications thereof are discussed in more detail in U.S. application Ser. No. 10/152,546, entitled "Photopic Detector System and Filter Therefor", filed on May 21, 2002 and incorporated herein by reference. The filter frames can include an aperture adapted to receive a photodetector. The photodetector/filter assembly combination provides a modified detection system with spectral properties resulting in part from the photodetector's spectral properties and in part from the spectral transmission of the multilayer optical film. Reference is also made to U.S. application Ser. No. 10/268,118, entitled "Method for Subdividing Multilayer Optical Film Cleanly and Rapidly", filed on even date herewith and incorporated herein by reference.

The utility of the described method of subdividing a sheet of multilayer optical film body into pieces thereof is in no way limited to forming strips of such material for use in box filters. The method is useful anywhere a piece or pieces (particularly a large number of pieces, e.g., at least 10, at least 50, or at least 100) of a multilayer optical film body are to be obtained from a larger sheet or roll of such material, and particularly where delamination along the edges of the multilayer optical film can be problematic and where a clean surface over the entire piece of multilayer optical film body is desired.

Figure 7:
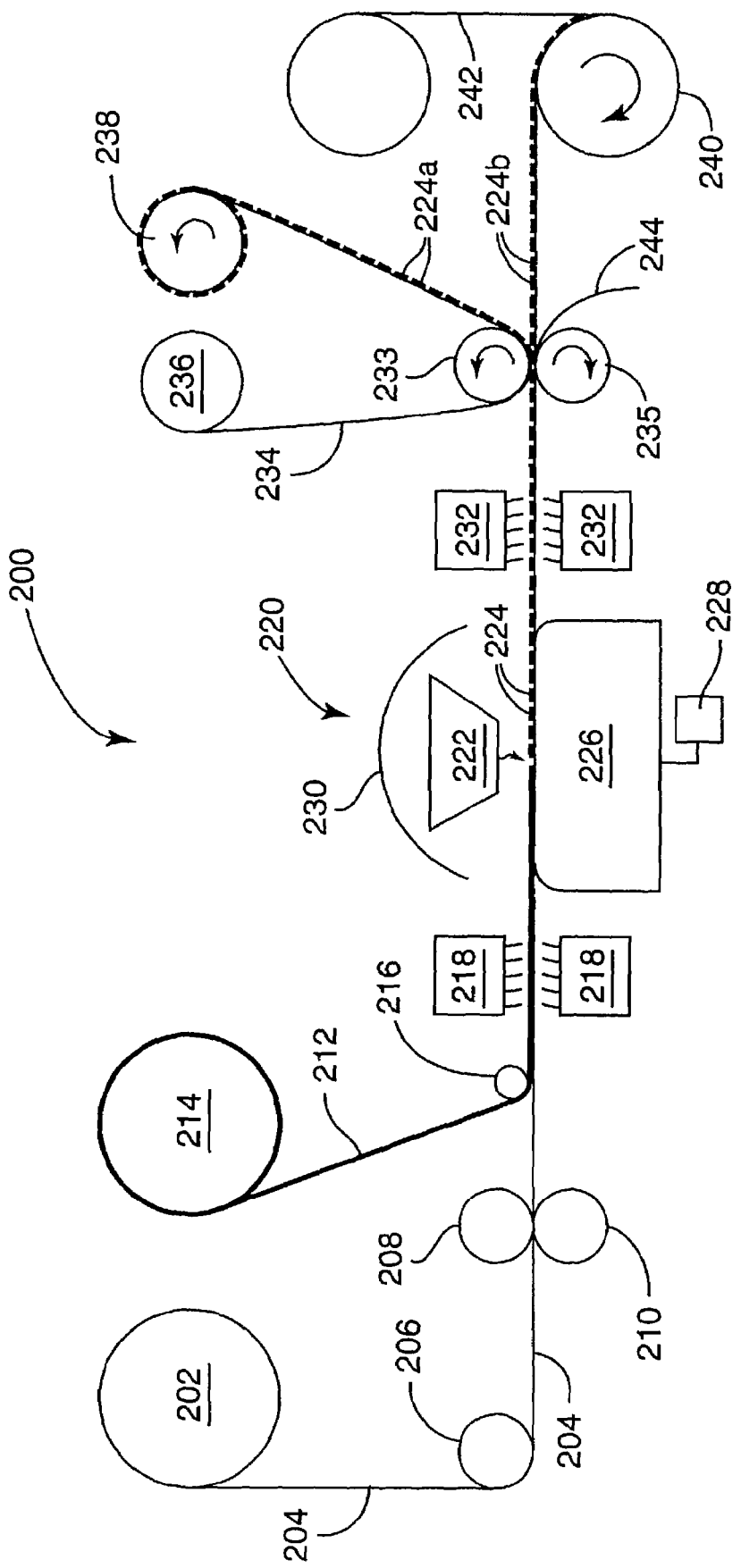
FIG. 7 depicts a continuous process for subdividing a multilayer optical film body.

FIG. 7 depicts a roll-to-roll process 200 for forming melt zones in a sheet of multilayer optical film body as well as converting such a sheet into smaller pieces of multilayer optical film body cleanly and rapidly. Roll 202 is unwound to provide a laminate film 204 that can consist essentially of a polymeric multilayer optical film body (e.g., element 40 in FIG. 3) and a second liner (e.g., liner 44 in FIG. 3) adhered to one major surface (designated arbitrarily as the second major surface) of the multilayer optical film body. In a previous step not shown, the second liner was applied to the second major surface of the multilayer optical film body such as by electrostatic attraction or by use of a small amount of low tack adhesive. The laminate film 204 passes around an idler roller 206 such that the multilayer optical film body contacts the roller 206. Laminate film 204 then passes through torque-driven nip rollers 208, 210. A first liner 212 (e.g., element 42 in FIG. 3) is unwound from a roll 214, brought into close proximity with laminate film 204 by idler roller 216, and applied to the multilayer optical film body component of laminate film 204 by passing the films proximate a conventional static bar 218. The electrostatic forces imparted by static bar 218 produce an intimate contact between first liner 212 and a first major surface of the multilayer optical film. The film combination 204/212 ("web") then passes through a laser radiation station 220, where laser radiation from a laser control module 222 is directed at the web to produce discrete pieces 224 of the multilayer optical film body and of the first liner, as shown in FIG. 3. A flat table 226 is provided with a honeycomb array of holes connected to a vacuum source 228 to keep the web uniformly flat across its width (cross-web direction) and along a substantial portion of its length (down-web direction) during laser cutting. Laser module 222 includes beam shaping and steering optics and controls that can cut a programmed pattern of cut lines (including melt zones), each at predetermined power settings, while the web moves at a constant speed. Alternatively, the motion of the web can be stopped while the laser module 222 cuts a first pattern of cut lines, then advances forward and stops again to permit the laser module to cut a second pattern of cut lines, and so on in a step-and-repeat fashion. Preferably, laser radiation station 220 includes an exhaust hood 230 configured to provide a strong air flow across the web in a given direction. The air flow helps reduce optical distortion from the plume of smoke and debris that is generated at the point of laser cutting. Preferably, during cutting, the beam steering optics in the laser module 222 moves the laser cutting point on the web in directions that have substantially no component parallel to the direction of airflow to further avoid distortion from the plume.

Immediately after the web exits laser radiation station 220, now partially cut to define pieces 224, it passes proximate a conventional neutralizer bar 232. The neutralizer bar eliminates or at least reduces the electrostatic attraction between the pieces of multilayer optical film body of laminate film 204 and the pieces of first liner 212. With the bond between the corresponding pieces thus weakened, an adhesive tape 234 is unwound from a roll 236 and passed through a pair of nip rollers 233, 235 where the adhesive-coated side of tape 234 is pressed against discontinuous pieces 224a of the first liner. As one take-up roll 238 pulls tape 234 in one direction and another take-up roll 240 pulls the web in a different direction, tape 234 separates and carries away debris-coated first liner pieces 224a from the now pristine pieces 224b of multilayer optical film body. The web is then wound up loosely with a silicone-coated PET liner 242 for temporary protection during storage and handling. In a later step, the second liner can be guided over a sharp bend or radius to completely separate the loosely held multilayer optical film body pieces 224b from the second liner as well.

Nip rollers 233, 235 can be driven at a constant speed to act as the speed loop for roll-to-roll system 200. Depending on the number, density, orientation, and type of cut lines to be made by the laser module 222, the web (i.e., the film combination 204/212) can be greatly weakened at the laser radiation station 220. To prevent web breakage, it may be desirable to provide additional strength to the web by leaving at least one strip of the web, and preferably one strip on each side of the web, continuous and uncut. Such continuous strips, referred to herein as "weed", can be discarded immediately after nip rollers 233, 235 as shown with reference numeral 244.

Figure 8:
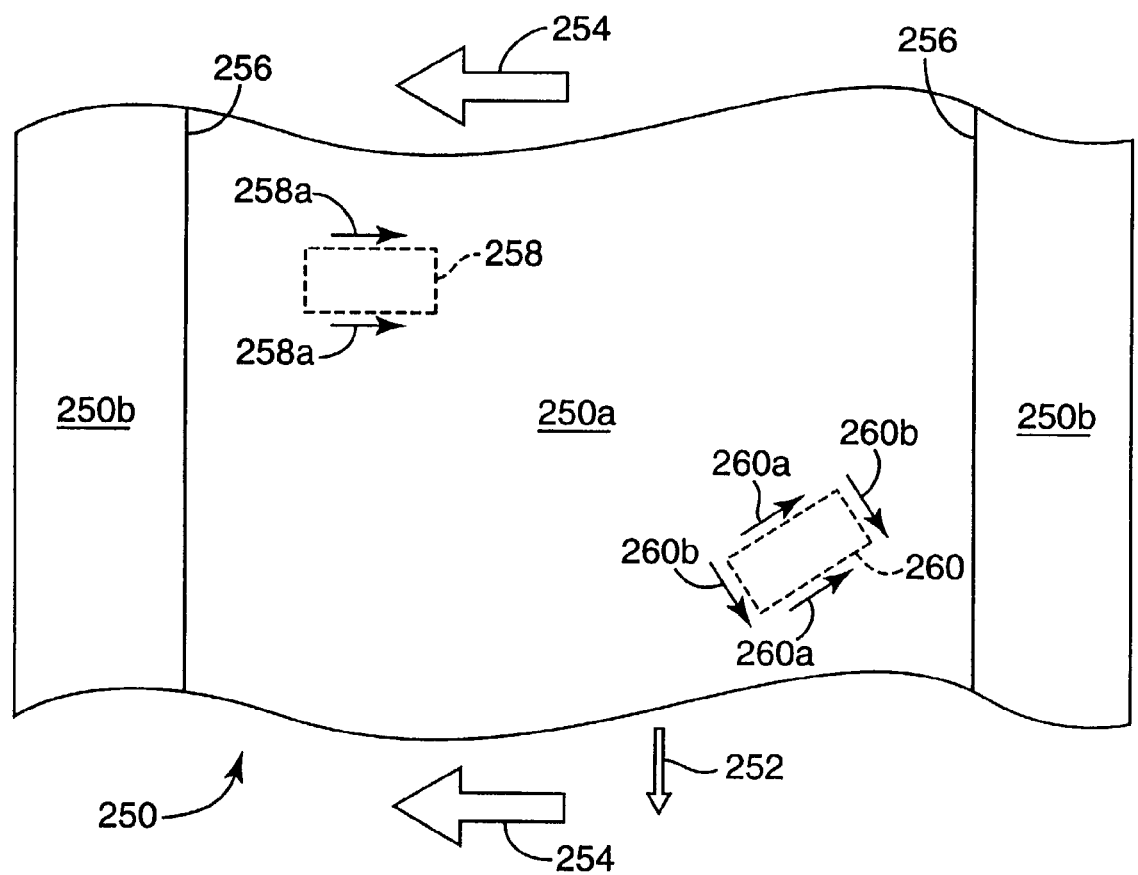
FIG. 8 shows a plan view of multilayer optical film body as it is being cut.

FIG. 8 shows a top view of a web 250—comprising a polymeric multilayer optical film sandwiched between a first and second liner—at the laser radiation station 220 (see FIG. 7). Web 250 moves along a direction 252. An air current is set up by exhaust hood 230 to provide air current in a direction 254 transverse to the web. The web 250 is segregated into a central working portion 250a and weed portions 250b, which portions are separated from the working portion 250a by cut lines 256. Some strengthening of the web can be achieved if cut lines 256 are through-cut lines, but additional strengthening can be achieved if they are kiss-cut lines since the lower liner 44 would in that case be intact between the working portion 250a and the weed portions 250b. Additional cut lines—preferably kiss-cut lines—define representative shapes 258, 260 for pieces to be cut. To help reduce distortion due to the plume of smoke and vaporized material, laser module 222 can be programmed to scan the laser cutting point in preferred directions 258a, 260a-b as shown, which are or which have components that are antiparallel to air flow direction 254.

Optionally, the web 250 can have two distinct weed portions on each side of the web, i.e., a left outer weed portion along the left side of FIG. 8 and a right outer weed portion along the right side of FIG. 8. An additional through-cut made by the laser module 222 separates such outer weed portions from weed portions 250b, the latter of which can be described as inner weed portions, and which would then utilize kiss-cut lines at 256. If present, the outer weed portions can be separated from the inner weed portions and collected immediately after the laser cutting station 220. Such outer weed portions help provide a clean uniform edge for the final roll product. Meanwhile, the inner weed portions travel with the remainder of the web through nip rollers 233, 235 as described above.

EXAMPLE

A polymeric multilayer interference film was manufactured by coextruding alternating layers of a low melt coPEN made from a 90/10 copolymer of polyethylene naphthalate (PEN)/polyethylene terephthalate (PET) and polymethylmethacrylate (PMMA) at about 277° C. to form an extrudate having 224 individual layers sandwiched between two outer skin layers composed of the low melt coPEN. These layers defined an optical packet consisting essentially of 112 unit cells with an approximately linear thickness gradient along an axis perpendicular to the stack. The thickest unit cell, located at one side of the packet, was approximately 1.3 times thicker than the thinnest unit cell, located at the other side of the packet. The optical packet was asymmetrically multiplied to give a multilayer optical film construction having 448 individual layers with outer skin layers and an interior polymer boundary layer (PBL) between packets. The layer multiplication was carried out so that one of the optical packets had an overall thickness about 1.3 times that of the other packet. The extrudate was quenched on a chill roller to form a cast multilayer film. The cast film was sequentially stretched in the machine direction (MD) and the transverse direction (TD) using stretch ratios 3.4:1 and 3.4:1 respectively, producing a finished film having in-plane refractive indices ($n_{1x}$, $n_{1y}$) and an out-of-plane refractive index ($n_1$) of about 1.744, 1.720, and 1.508 respectively in the coPEN layers, and in-plane refractive indices ($n_{2x}$, $n_{2y}$) and an out-of-plane refractive index ($n_{2z}$) of about 1.495, 1.495, and 1.495 respectively in the PMMA layers. All indices were measured with a Metricon surface wave characterization device at 550 nm. The finished film comprised two optical packets each of ¼-wave design, and each with an approximately linear thickness gradient along an axis perpendicular to the plane of the film to give a range of reflected wavelengths within each optical packet. The thickest unit cell in the finished film had a thickness about 1.8 times that of the thinnest unit cell in the finished film, corresponding to a range of reflected wavelengths from approximately 665 nm to 1220 nm. Skin layers on the outsides of the optical structure were low melt coPEN, with an approximate thickness of 11 μm (0.43 mils). The overall film thickness was about 90 μm (3.7 mils).

Two substantially identical rolls of multilayer film made as described above were selected on basis of their optical properties, and were corona treated to improve adhesion. One of the corona-treated films was coated with a UV-initiated adhesive at approximately 122 μm (5 mils) and irradiated with UV light to activate the curing process of the adhesive. The adhesive, made by a hot melt extrusion process, was a homogeneous mixture of a thermoplastics component (ethylene vinyl acetate), a curable resins component (mixture of epoxy and polyol), and a photoinitiator component (a triaryl sulfonium hexafluoroantimonate salt). The two multilayer films were then laminated together and curing of the laminate adhesive was accelerated with a heat soak at 25° C. (80° F.) for 10 minutes. The resulting film body consisted of two multilayer optical films with a clear adhesive layer in between. The film body was in the form of a roll and had a thickness of approximately 12.4 mils (300 μm), a width of about 4 inches (100 mm), and a length of at least about 50 feet (well over 10 meters).

The film body, or interference element, thus constructed exhibited a reflection band in the near infrared wavelength region and a pass band in the visible region for normally incident light. Percent transmission was about 70% or more from about 450-640 nm, and was less than 1% from about 700-1140 nm, and less than 5% from 680-700 nm and from 1140-1160 nm.

The second liner was a high modulus paper with a thin layer of polyethylene adhered thereto with a strong pressure sensitive adhesive. The paper thickness was about 2 mils (50 μm), the polyethylene layer thickness was about 1 mil (25 μm), and the overall thickness of the second liner was about 3 mils (75 μm). The adhesive-coated paper was obtained under part number CT 1007 from TLC Industrial Tape, Harwood Heights, Ill. The polyethylene layer was laminated to one major surface of the multilayer optical film body in a continuous process using a nip roll. In a separate step, the adhesive-coated paper was laminated to the polyethylene layer. (Alternatively, the polyethylene layer can comprise a low tack adhesive on the side that contacts the multilayer optical film body and the same procedure followed.) This was rolled up and stored for days.

The first liner was a high modulus paper with a thickness of about 2 mils (50 μm), and one side was silicone-treated. The paper was purchased from Litin Paper Company, Minneapolis, Minn.

These elements were processed in a manner substantially as depicted in FIG. 7 to produce a plurality of strips substantially as shown in FIG. 5, except more cut lines and melt zones were provided to define eight active windows 67 rather than four, and except as noted below. The strips were about 4.5 mm wide and about 69 mm long, with the length being aligned with the downweb direction and the melt zones being aligned with the crossweb direction. (Alternatively, the strips can be aligned with the crossweb direction.) The melt zones that bounded perforation lines were spaced apart by about 1.5 mm, and melt zones that bounded window areas were spaced apart by about 5.5 mm. The silicone-treated side of the paper liner (first liner 212) was made to contact the laminate film 204. A constant web speed of about 2 to 3 ft/min (0.01 to 0.015 m/sec) was used. The web passed within about one-half inch (10 mm) of static bars 218, which were controlled to a setting just below the arc point. The web passed within a similar distance of neutralizer bars 232. At laser radiation station 220, a LaserSharp brand laser processing module, model LPM300, was used. The $CO_2$ laser had a spot size of about 8 mils (0.2 mm), and this produced kiss-cut and through-cut lines about 13-14 mils (0.35 mm) in width. The following settings were used for the following types of cut lines:

| Cut line/feature | Process Speed | Frequency |
| --- | --- | --- |
| Kiss-cut (CW) | 1100 mm/sec | 20 kHz |
| Kiss-cut (DW) | 875 mm/sec | 20 kHz |
| Perforation cut (CW) | 950 mm/sec | 2.2 kHz |
| Through-cut (DW) | 600 mm/sec | 20 kHz |
| Melt Zone (CW) | 1800 mm/sec | 20 kHz |

In this table, "CW" refers to a cut line that extends in the cross web direction, and "DW" refers to a cut line that extends in the down web direction. In addition, power was set to 100%, duty cycle was set to 50%, and jump speed was set to 5000 mm/sec for each of the features. The CW kiss-cut setting was used to cut minor edges 62b,62d of the strips (see FIG. 5), the DW kiss-cut setting was used to cut major edges 62a,62c of the strips and circular edges 64a,64b, the CW perforation setting was used for perforations 66, the DW through-cut was used for the cut-lines separating the working portion from the weed portions (see lines 256 in FIG. 8), and the CW melt zone setting was used for melt zones 68. The melt zone setting produced melt zones in which the upper multilayer optical film (i.e., the multilayer optical film adjacent the first liner) was completely vaporized along with the first liner, whereas the lower multilayer optical film (the multilayer optical film adjacent the second liner) was intact but exhibited substantial deformation/undulation of its constituent layers.

Continuous bands on either side of the web were used for weed, as depicted in FIG. 8, except that an inner and outer weed portion were formed on each side of the working portion as described previously. Each inner weed portion had a width of about one-eighth of an inch (about 3 mm). This can be compared to the central working portion of the web (see again FIG. 8), which had a width of about 3-3.5 inches (about 75 to 90 mm). The outer weed portions were roughly one-half inch wide (roughly 10 mm). The outer weed portions were separated from the remainder of the web and collected between the laser radiation station 220 and the neutralizer bar 232. Downweb of the laser radiation station 220, a roll of single-sided adhesive tape having a width about equal to the central working portion of the web was used for tape 234, in a continuous fashion. The tape was a conventional 3M™ painter's masking tape. The inner weed portions were separated from the second liner immediately after the nip rollers 233, 235 and rolled up on roll 238 along with the tape and pieces of first liner. Individual pieces (strips) of the multilayer optical film body were easily removed by hand from the second liner. Upon inspection, the pieces exhibited substantially no delamination along the laser-cut edges. Still smaller pieces were obtained by exerting a moderate amount of tensile force by hand to create breaks along the perforation lines. Examination of the edges so cut revealed delamination along the edges, but the delamination did not extend across the melt zones 68.

Various modifications and alterations of this invention will be apparent to those skilled in the art without departing from the scope and spirit of this invention, and it should be understood that this invention is not limited to the illustrative embodiments set forth herein.

What is claimed is:

1. A method of making a piece of a multilayer optical film body comprising a multilayer optical film, the method comprising:
   providing a multilayer optical film body having an arrangement of tens or hundreds of alternating microlayers of differing refractive index to provide desirable transmission and or reflection properties resulting from interference of light;
   directing laser radiation at the multilayer optical film body to form a melt zone that extends between a first and second portion of the multilayer optical film body; and
   severing the multilayer optical film body in the first portion to form an edge proximate the melt zone.

2. The method of claim 1, wherein at least a first liner is removably applied to the multilayer optical film body before the directing step.

3. The method of claim 2, wherein the laser radiation is directed at the multilayer optical film through the first liner, and wherein the first liner is removed from the multilayer optical film body after the directing step.

4. The method of claim 1, further comprising forming holes defining a perforation line in the first portion.

5. The method of claim 1, wherein the severing step produces delamination of the multilayer optical film in the first portion.

6. The method of claim 1, wherein the severing step is performed after the directing step.

7. The method of claim 1, wherein the directing step forms a plurality of distinct melt zones, and wherein the severing step severs the multilayer optical film body between pairs of melt zones.

* * * * *

UNITED STATES PATENT AND TRADEMARK OFFICE
CERTIFICATE OF CORRECTION

PATENT NO. : 7,396,493 B2
APPLICATION NO. : 10/268354
DATED : July 8, 2008
INVENTOR(S) : Bruce E. Tait It is certified that error appears in the above-identified patent and that said Letters Patent is hereby corrected as shown below:

Column 1,
Line 7, after "of" delete "pending".

Column 3,
Line 64, delete "$\Delta_y$" and insert -- $\Delta n_y$ --, therefor.

Column 4,
Line 15, delete "1,2" and insert -- 1, 2 --, therefor.
Line 15, delete "$n_{1x} \leq n_{2x}$., i.e., $\Delta n \leq 0$." and insert -- $n_{1x} \geq n_{2x}$., i.e., $\Delta n_x \geq 0$. --, therefor.

Column 9,
Line 43, delete "10,268,118," and insert -- 10/268,118, --, therefor.
Line 44, before "entitled" insert -- (Attorney Docket No. 57743US003), --.

Column 11,
Line 62, delete "($n_1$)" and insert -- *($n_{1z}$)* --, therefor.
Line 65, delete "($n_{21}$)" and insert -- ($n_{2z}$) --, therefor.

Column 14,
Line 26, after "hundreds of" insert -- two --.

Signed and Sealed this

Fourteenth Day of October, 2008

JON W. DUDAS
*Director of the United States Patent and Trademark Office*